United States Patent [19]

Gardosi

[11] Patent Number: 5,531,152
[45] Date of Patent: Jul. 2, 1996

[54] PLATEN ASSEMBLY FOR COFFEE MAKER USING PRE-DOSAGED COFFEE FILTER PACKETS

[75] Inventor: Giancarlo Gardosi, Zolas Predosa, Italy

[73] Assignee: Grimac Royal Falcon Corp., Old Field, N.Y.

[21] Appl. No.: 369,129

[22] Filed: Jan. 5, 1995

[51] Int. Cl.$^6$ ................................................. A47J 31/44
[52] U.S. Cl. ........................................ 99/289 R; 99/295
[58] Field of Search ................................. 99/279, 289 R, 99/293, 295, 297, 298, 304, 289 D, 289 T; 426/77, 80, 82, 432, 433

[56] References Cited

U.S. PATENT DOCUMENTS

| | | | |
|---|---|---|---|
| 2,899,886 | 8/1959 | Rodth | 99/295 |
| 3,209,676 | 10/1965 | Zimmerman et al. | 99/295 |
| 3,356,011 | 12/1967 | Parraga | 99/295 |
| 3,413,909 | 12/1968 | Heier | 99/295 |
| 3,878,772 | 4/1975 | Nordskog | 99/295 |
| 4,254,694 | 3/1981 | Illy | 99/295 |
| 4,421,014 | 12/1983 | Vicker | 99/295 |
| 4,429,623 | 2/1984 | Illy | 99/295 |
| 4,934,258 | 6/1990 | Versini | 99/289 R |

FOREIGN PATENT DOCUMENTS

| | | | |
|---|---|---|---|
| 2424010 | 12/1979 | France | 99/289 R |
| 2421808 | 11/1975 | Germany | 99/304 |

Primary Examiner—David Scherbel
Assistant Examiner—Tony G. Soohoo
Attorney, Agent, or Firm—Galgano & Burke

[57] ABSTRACT

An espresso coffee machine that includes a pad receiving holder for receiving disposable coffee pad containing a predetermined amount of finely ground coffee beans from which espresso or cappuccino coffee is prepared. The pad receiving holder includes a first member and a second member. The first member has a first surface in fluid communication with at least one of a supply of steam and hot water and the second member has a second surface in fluid communication with a spout. The first member and the second member are movable between an open position for receiving a coffee pad and a closed position for forming, between the first surface and the second surface, a chamber to contain the coffee pad, whereby in the closed position the at least one of a supply of steam and hot water to pass through the chamber containing a coffee pad and to discharge as espresso coffee from the spout.

8 Claims, 5 Drawing Sheets

PLATEN ASSEMBLY FOR COFFEE MAKER USING PRE-DOSAGED COFFEE FILTER PACKETS

BACKGROUND OF THE INVENTION

The present invention relates generally to a coffee machine. More particularly, the invention relates to an espresso coffee machine that includes a pad receiving holder for receiving a disposable coffee pad containing a predetermined amount of finely ground coffee beans from which espresso or cappuccino coffee is prepared.

Espresso is coffee prepared from finely ground coffee beans, through which steam and hot water, under high pressure, is forced. A conventional espresso coffee machine includes a boiler in which a given quantity of water inside the boiler is forced through finely ground coffee beans as a result of over pressure formed inside the boiler when a heating source, connected to the boiler, is activated.

A conventional espresso coffee machine includes a detachable holder for containing finely ground coffee beans from which espresso or cappuccino coffee is prepared. Specifically, the detachable holder includes a handle attached to a cupped member having at its lower end a spout for the discharge of espresso coffee. Finely ground coffee beans are contained in a sieve or filter which is placed in the cupped shaped member of the detachable holder. The detachable holder, along its upper edge of the cupped shaped member, is typically detachably secured by suitable connecting means to a support in or on the housing for receiving steam or hot water from the conventional espresso coffee machine.

Suitable connecting means typically include a bayonet lock connection in which the upper edge of the cupped shaped member includes wedge like cams which are receivable in complementary cam slots in or on the housing. The detachable holder requires a user to position the detachable holder in or on the housing and rotate the handle clockwise or counterclockwise to secure the detachable holder in place and reversely rotate the handle to separate the holder from the housing. Conventional espresso coffee machines, which include a detachable holder for containing finely ground coffee beans from which espresso or cappuccino coffee is prepared, are disclosed in U.S. Pat. No. 4,644,856 granted to Borgmann, U.S. Pat. No. 4,632,024 granted to Cortese, U.S. Pat. No. 4,660,466 granted to Fries, U.S. Pat. No. 5,115,730 granted to Gockelmann, et al.

A conventional espresso coffee machine, that includes a detachable holder for receiving a sieve or filter for containing finely ground coffee beans, exhibits several drawbacks in preparing espresso or cappuccino coffee.

First, a conventional espresso coffee machine having a detachable holder requires a user to exercise care in measuring out the required amount of finely ground coffee beans to be placed in a filter or sieve of the detachable holder.

Second, a conventional espresso coffee machine having a detachable holder requires a user to exercise care in properly aligning the cams on the detachable holder in the cam slots in or on the housing and rotating either clockwise or counterclockwise to secure.

Third, a conventional espresso coffee machine having a detachable holder requires a user, after preparing espresso coffee, to remove the used grounds from the detachable holder. This procedure often requires the user to scrape out the used grounds from the filter or sieve. To properly clean the filter or sieve also requires that it be washed under running water to clean and unclog the extremely fine holes which retain the finely ground coffee beans in the filter or sieve.

Fourth, a conventional espresso coffee machine having a detachable holder requires a user to exercise caution in handling the detachable holder after preparing espresso coffee due to the detachable holder becoming extremely hot from the steam and hot water flowing through the detachable holder to prepare espresso coffee.

Fifth, often a user will not remove a detachable holder from its supports on the housing immediately after use and particularly not after preparing the last cup of espresso coffee, thereby increasing the effort in later cleaning the holder, sieve or filter, and espresso coffee machine.

Thus, there is a need for an espresso coffee machine that eliminates the above described drawbacks in time and effort expended by a user in preparing espresso or cappuccino coffee. More particularly there is a need for an espresso coffee machine that enables a user to consistently prepare a superior tasting cup of espresso or cappuccino coffee in which the espresso coffee machine includes a pad receiving holder for receiving disposable coffee pad containing a predetermined amount of finely ground coffee beans from which espresso coffee is prepared.

SUMMARY OF THE INVENTION

Accordingly, it is an object of the present invention to provide an espresso coffee machine that consistently produces superior tasting espresso coffee with minimal effort on behalf of the user.

It is another object of the present invention to provide an espresso coffee machine that eliminates the conventional detachable holder for containing finely ground coffee beans and instead includes a pad receiving holder for receiving a coffee pad containing a predetermined amount of finely ground coffee beans from which espresso coffee is prepared.

It is still another object of the present invention to provide an espresso coffee machine that reduces the time and effort required by a user for preparing espresso or cappuccino coffee by utilizing a coffee pad that conveniently contains finely ground coffee beans between two layers of filter paper and which after preparing espresso coffee can be easily removed from the pad receiving holder and replaced with a new one.

It is a further object of the present invention to provide an espresso coffee machine that can be easily and inexpensively manufactured for wide spread commercial or residential use in preparing espresso or cappuccino coffee.

Certain of the foregoing and related objects are readily obtained in a coffee machine that utilizes a coffee pad containing a predetermined amount of ground coffee from which espresso or cappuccino coffee is prepared. The coffee machine comprises a first member having a first surface in fluid communication with at least one of a supply of steam and hot water, and a second member having a second surface in fluid communication with a spout. The first member and the second member are movable between an open position for receiving a coffee pad and a closed position for forming, between the first surface and the second surface, a chamber to contain the coffee pad, whereby in the closed position the at least one of a supply of steam and hot water to pass through the chamber containing a coffee pad and to discharge as espresso coffee from the spout. Preferably, the second member includes a filter member in fluid communication with the spout in which the filter member defines the second surface and the filter member has a plurality of apertures for passage of at least one of steam, hot water and espresso coffee. Most preferably, the filter is formed from metal such as stainless steel. Desirably, the first surface and the second surface are cup-shaped for receiving a coffee pad.

Preferably, the coffee machine further includes movable means operatively connected to move at least one of the first member and the second member between the open position and the closed position. The movable means includes a platen attached to the second member and a handle operatively connected to the platen to move the second member with respect to the first member between an opened and a closed position. Desirably, the platen is slidable on two vertical posts. One embodiment of the movable means includes a stationary engaging member attached to the platen and a rotatable engaging member attached to the handle.

Certain of the foregoing and related objects are also readily obtained in a method for preparing espresso coffee from a disposable filter pad containing finely ground coffee beans. The method comprises the steps of: providing an espresso coffee machine having a first member in fluid communication with at least one of a supply of steam and hot water, a second member in fluid communication with a spout, the first member and the second member being movable between an open position for receiving a coffee pad and a closed position for forming, between the first surface and the second surface, a chamber to contain the coffee pad; inserting a disposable filter pad between the first member and the second member; moving at least one of the first member and the second member to the closed position to contain the disposable filter pad in the chamber; and permitting at least one of the supply of steam and hot water into the first member to pass through the chamber containing a coffee pad and to discharge as espresso coffee from the spout.

BRIEF DESCRIPTION OF THE DRAWINGS

Other objects and features of the present invention will become apparent from the following detailed description considered in connection with the accompanying drawings, which disclose several embodiments of the invention. It is to be understood that the drawings are to be used for the purpose of illustration only and not as a definition of the limits of the invention.

In the drawings, wherein similar reference characters denote similar elements throughout the several views.

DETAILED DESCRIPTION OF THE PREFERRED EMBODIMENT

Figure 1:
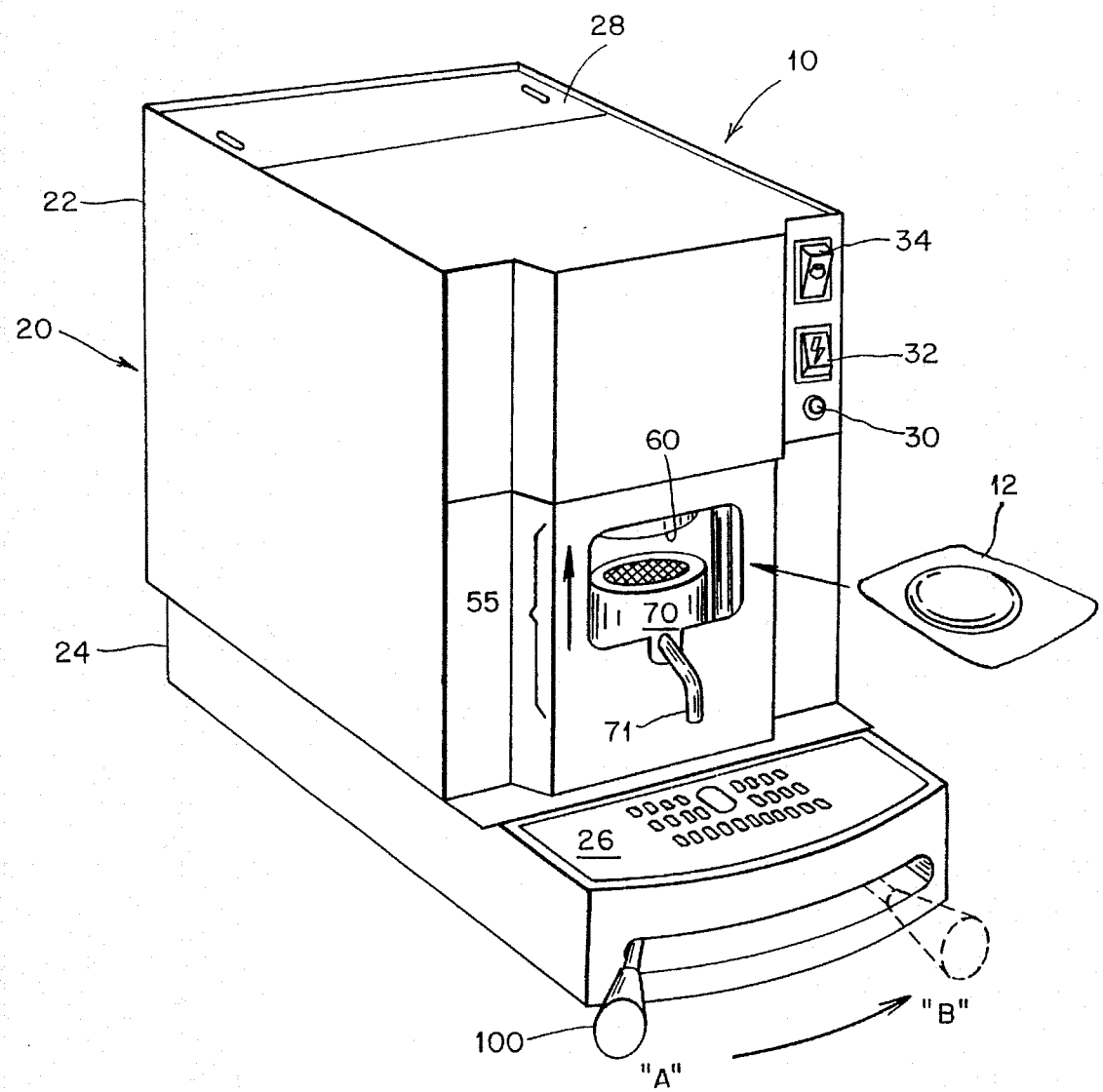
FIG. 1 is a perspective view of an espresso coffee machine of the present invention that includes a pad receiving holder for receiving a disposable coffee pad containing a predetermined amount of finely ground coffee beans from which espresso or cappuccino coffee is prepared.
Figure 2:
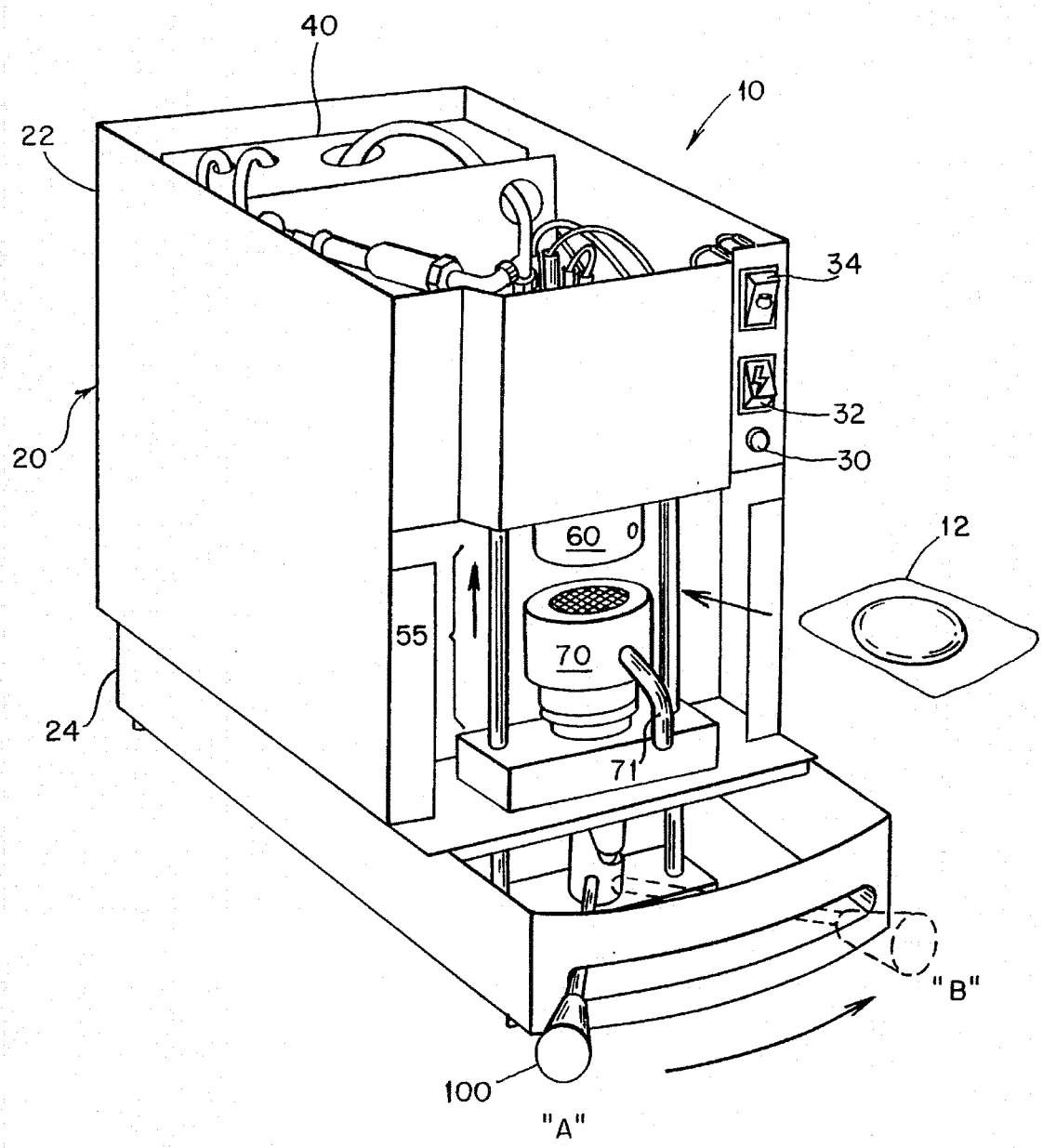
FIG. 2 is a perspective view showing the espresso coffee machine of FIG. 1 in more detail.

Turning now to the drawings and in particular to FIGS. 1 and 2, therein illustrated is an espresso coffee machine 10 embodying the present invention that utilizes a disposable coffee pad 12 containing a predetermined amount of finely ground coffee beans from which espresso or cappuccino coffee is prepared. Coffee pad 12 contains a predetermined amount of finely ground coffee beans between two layers of filter paper. Noticeably seen in FIGS. 1 and 2, is that espresso coffee machine 10 does not include a conventional detachable holder for containing finely ground coffee beans from which espresso coffee is prepared. Most noticeably seen in FIGS. 1 and 2, is that espresso coffee machine 10 includes a pad receiving holder 55 having a first member 60 and a second member 70. Second member 70 is movable, in the direction of the vertically extending arrow, between an open position and closed position (not show in FIGS. 1 and 2) upon a simple hand movement of a handle 100, in the direction of horizontally curved arrow, from position "A," to position "B."

Specifically, in an open position, pad 12 is easily insertable in pad receiving holder 55 between first member 60 and second member 70 and placed on second member 70. In a closed position, pad 12 is contained between first member 60 and second member 70 and steam or hot water is permitted to pass through first member 60, pad 12, and second member 70, for the discharge of espresso coffee from spout 71 into a cup (not shown).

It is appreciated that espresso coffee machine 10 can be easily configured by one skilled in the art to provide hot water and steam spouts with separate circuits for the production of tea, hot water, etc.

Referring still to FIGS. 1 and 2, espresso coffee machine 10 is provided with a housing 20 having an upright portion 22 attached to a relatively large flat base 24. The front of base 24 contains a perforated cover plate 26 (shown in FIG. 1) which serves as a platform for one or more cups (not shown). Upright portion 22 includes a cover 28 shown in covering position in FIG. 1 but which can be lifted or opened to permit access to a water tank 40 as shown in FIG. 2. The front of upright portion 22 includes a main power or on-off switch 32, a pilot light 30 and a coffee dispensing switch 34. The operation of espresso coffee machine 10 is described in greater detail below in an operation section.

Figure 3:
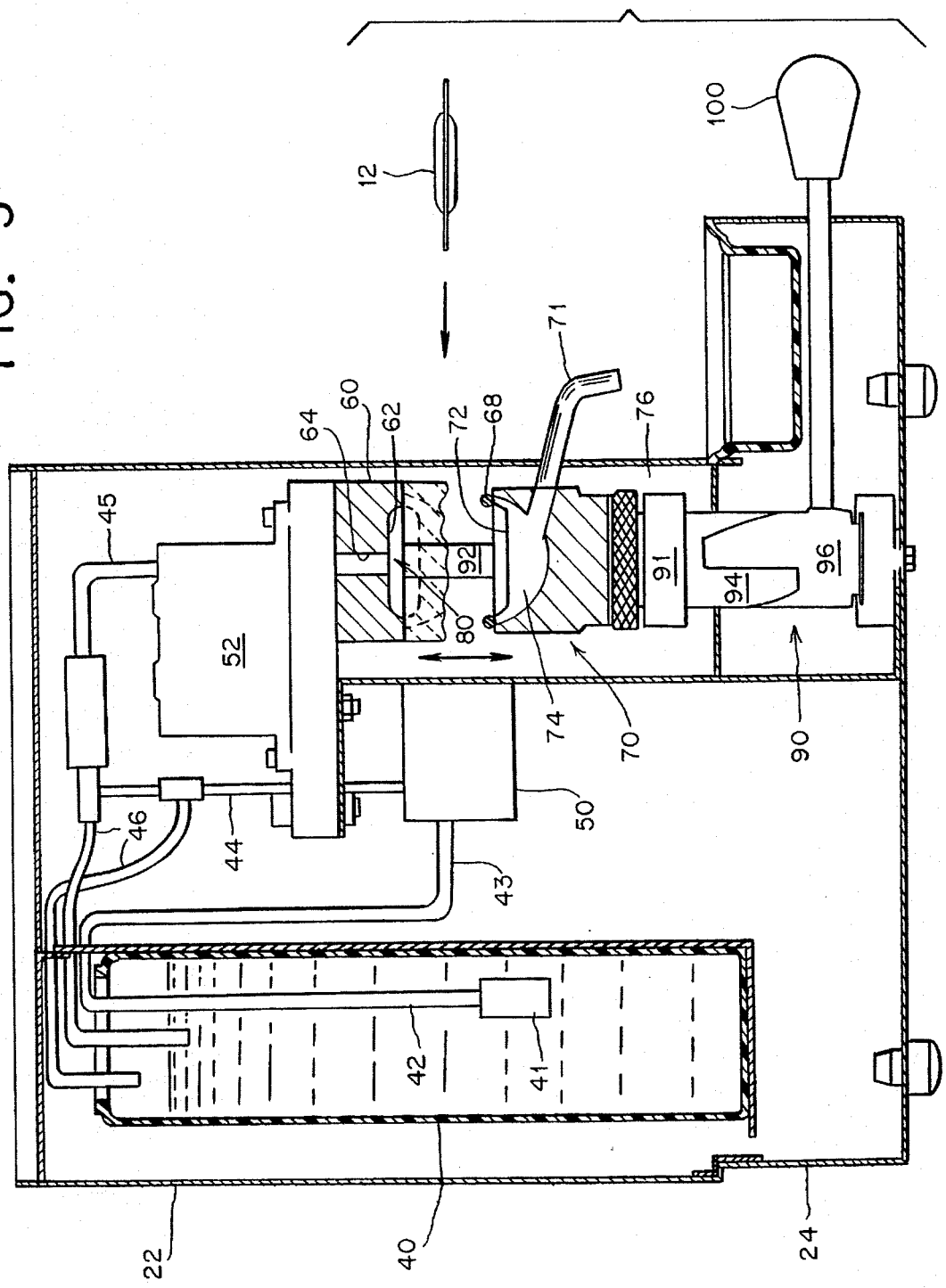
FIG. 3 is a side elevational, partially sectional view showing the espresso coffee machine of FIG. 1 in still more detail.

Referring now to FIG. 3, the interior of espresso coffee machine 10 can be seen in greater detail. Espresso coffee machine 10 is provided with water tank 40 in which a cold water supply tube 42 having a filter 41, such as an active carbon filter, attached at one end which is immersed in tank 40. The opposite end of tube 42 is attached to a water pump 50. Water pump 50 is connected via tubing 44 and 45 to a water heater 52. Tubes 46 provide for a return supply of water to tank 40 in case of obstruction in the flow of water to heater 52. Heater 52 contains conventional heating elements operatively connected to switch 32 (not shown) and a thermostat operatively connected to pilot light 30 and coffee dispensing switch 34 for signaling to a user when the temperature of the water in heater 52 is at a proper level for preparing espresso coffee. Heater 52 contains a reservoir for enough water to prepare a cup of espresso coffee and includes a discharge opening (not shown) attached to first member 60. Preferably, the base of tank 40 includes an electrical safety device (not shown) that blocks espresso coffee machine 10 from functioning in the event that the water in tank 40 is empty or should become empty. In additional, tube 41 can be directly connected to a water supply main for a constant supply of cold water, eliminating the need to periodically refill tank 40 with water.

As shown in FIG. 3, espresso coffee machine 10 includes first member 60 having a first surface 62 in fluid communication via passage 64 for receiving a supply of steam or hot water from heater 52, and a second member 70 having a second surface 72 in fluid communication with spout 71. Preferably, first surface 62 and second surface 72 are cup-shaped for receiving coffee pad 12. Desirably, second member 70 includes a filter member 76 which defines the center of second surface 72. Although filter member primarily supports coffee pad 12 in second member 70, it is desirable that filter member 76 has a plurality of apertures for passage of steam, hot water and espresso coffee. The size of the apertures need not be as small as those typically configured in a filter or sieve used in a conventional detachable holder, since the finely ground coffee beans are retained not in filter member 76 but between the two layers of filter paper in coffee pad 12. Preferably, filter member 76 is formed from metal such as stainless steel.

Referring still to FIG. 3, first member 60 and second member 70 are movable between an opened position, as show in FIG. 3, for receiving coffee pad 12 and a closed position in which second member 70, shown in phantom, is located adjacent first member 60 so that formed between first surface 62 and 72 is a chamber 80 to contain coffee pad 12. Preferably, first member 60 includes an o-ring 68 positioned around first surface 62 for mating engagement, in the closed position, with second surface 72 of second member 70.

Preferably, espresso coffee machine 10 further includes movable means 90 operatively connected to move second member 70, with respect to first member 60, between an open and closed position. Movable means 90 includes a platen 91 which is attached at its upper surface to second member 70 and which is guided for vertical movement by two vertically extending posts 92, only one of which is shown in FIG. 3. Attached to the lower surface of support 91 is a stationary or fixed engaging cam member 94 which cooperatively engages a corresponding rotatable engaging cam member 96. Rotatable engaging member 96 is manually hand operable by handle 100 to be rotated and cause stationary engaging member 94 and support member 91 and second member 70, to move upwardly whose handle 100 is moved from the left to the right as shown by the arrow in FIG. 1.

It will be appreciated that alternative movable means to move second member 70 with respect to first member 60 between an open position and a closed position could be equally well employed. Such alternative movable means could include, a lever actuated pivoted link means, a cam follower means, etc.

Operation

The operation of espresso coffee machine 10 will be described with reference to FIGS. 4 and 5, in which espresso coffee machine 10 requires tank 40 (not shown) to be filled with water and an electrical plug (not shown) must be plugged into an electrical socket (not shown). Before operating espresso coffee machine 10 for the first time requires the heater to be primed with water. With pad receiving holder 55 in a closed position, power switch 32 is turned on and cup dispensing switch 34 is held in an "on" position until water discharges spout 71.

Figure 4:
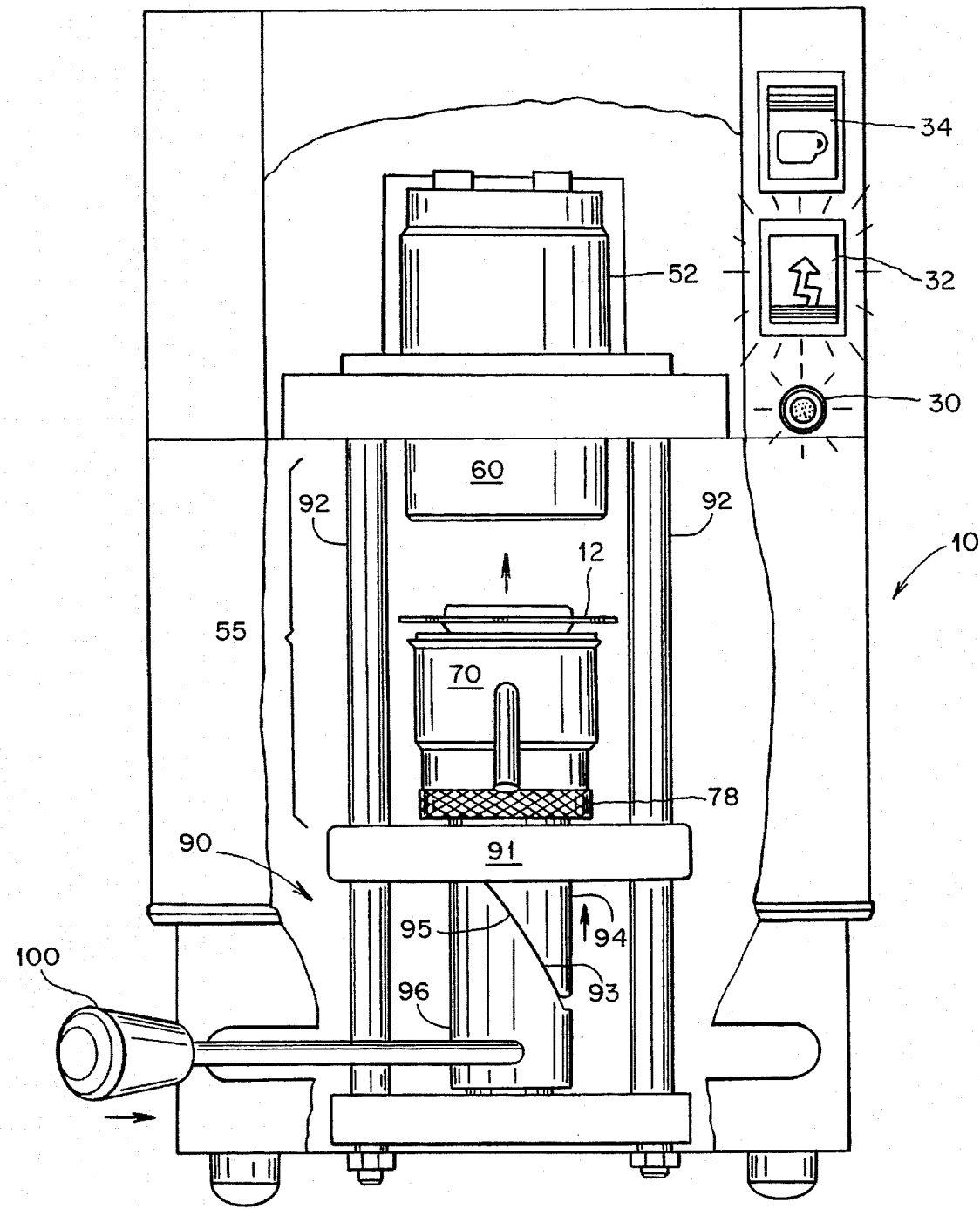
FIG. 4 is an enlarged, side elevational, partially broken away view, showing a pad receiving holder, of the espresso coffee machine of FIG. 1, in an open position for receiving a disposable coffee pad.

Referring first to FIG. 4, main power switch 32 is turned on which causes the switch 32 and pilot light 30 to light up. Water in heater 52 begins to heat up and after about 2 to 5 minutes the pilot light 30 will go out. Pad receiving holder 55 is placed in an open position by moving handle 100 to the left. Coffee pad 12 is placed on second member 70 making sure coffee pad 12 is centered.

Figure 5:
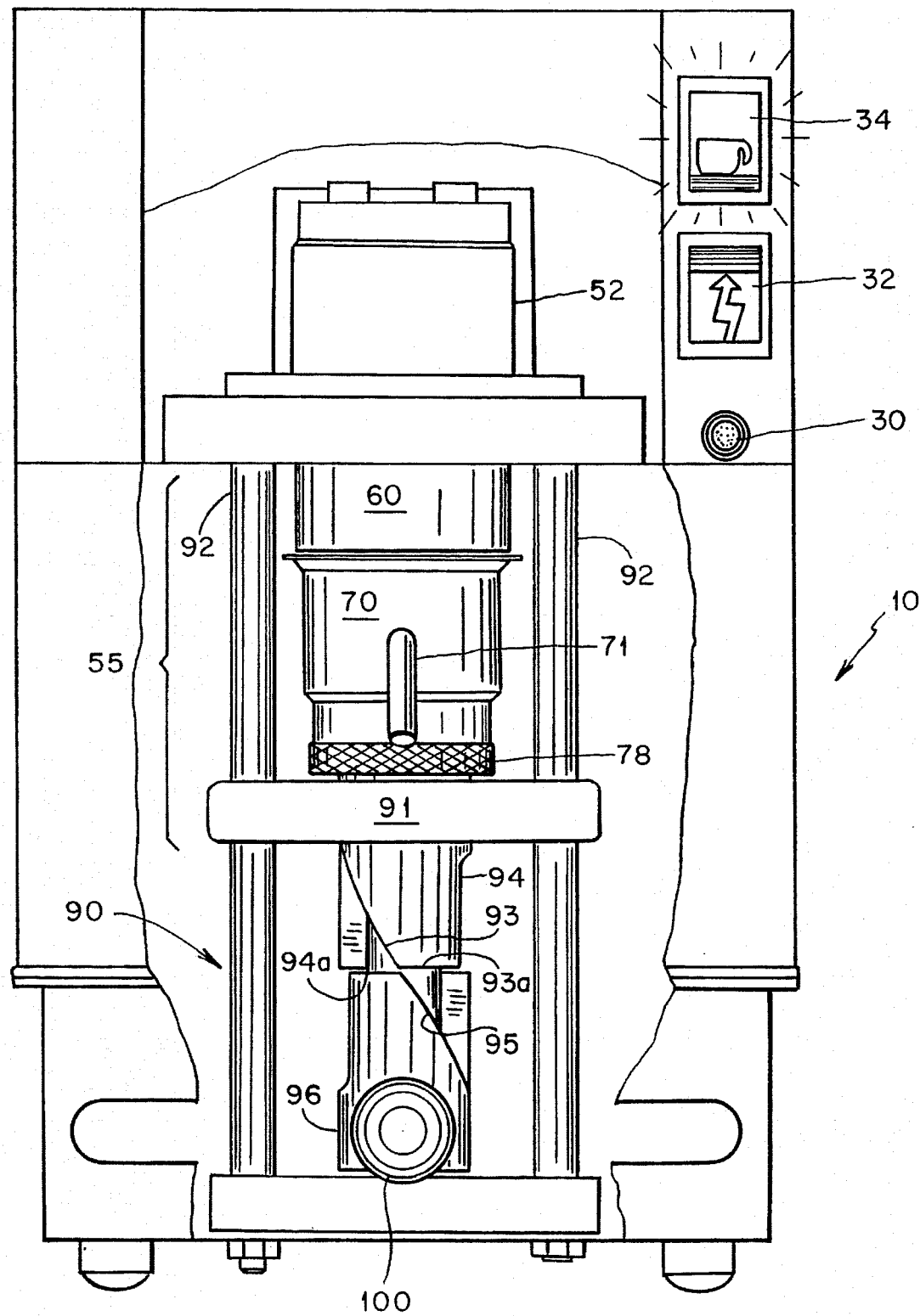
FIG. 5 is an enlarged, side elevational, partially broken away view, showing the pad receiving holder, of the espresso coffee machine of FIG. 1, in a closed open position for preparing espresso coffee.

Referring now to FIG. 5, turning handle 100 to the right locks pad receiving holder 55 in as a closed position. Specifically, cam surface 95 of rotating engaging cam member 96 forces upward cam surface 93 of stationary engaging cam member 94 to move and ride up in a cam-like action as handle 100 is pivoted from left to right (FIG. 1) so that platen 91 and second member 70 move upward and contain coffee pad 12 between first member 60 and second member 70. This closed positioned is achieved by flat surface 93a coming to rest upon and lock in place with flat surface 94a, thereby, in turn, locking in place pad receiving holder 55 when handle 100 is fully moved to the right. Adjustable rotating knurled knob 78 adjusts the seal formed in the closed position between first member 60 and second member 70.

After pilot light 34 goes out, espresso coffee can be prepared. A cup (not shown) is placed below spout 71 and coffee dispensing switch 30 is depressed to discharge from spout 71 espresso coffee until pilot light 30 goes back "on," at which time coffee dispensing switch 34 is released. Returning handle 100 to the left causes unlocking and lowering of the cam member 94 via the camming action of surfaces 94, 95, so that, in turn, second member 70 is returned to its lower open position to permit coffee pad 12 to be removed and disposed and a new coffee pad can then be inserted.

Thus, while only several embodiments of the present invention have been shown and described, it is obvious that many changes and modifications may be made thereunto without departing from the spirit and scope of the invention.

What is claimed is:

1. A coffee machine that utilizes a coffee pad containing a predetermined amount of ground coffee from which espresso or cappuccino coffee is prepared, said coffee machine comprising:

means for supplying at least one of steam and hot water;

a first upper chamber member having a first surface connected via a first passage to said supply means;

a second lower chamber member having a second surface connected via a second passage to a spout;

said first member and said second member being movable between an open position for receiving a coffee pad and a closed position for forming, between said first surface and said second surface, a closed sealed chamber to contain the coffee pad so that in said closed position the at least one of a supply of steam and hot water passes through said chamber containing a coffee pad and discharges as espresso coffee from said spout; and movable means for moving said first member and said second member between said open position and said closed position thereof, said movable means including a platen attached to said second member, two spaced apart vertical posts on which said platen is vertically and reciprocally movable, a horizontally-pivotal elongate handle, a stationery first cam member attached to said platen and a rotatable second cam member attached to said handle and disposed beneath and cammingly engaged with said stationary first cam member, said first and second cam members being configured and dimensioned such that when said handle is pivoted horizontally from one side to another said second cam member pivotally rotates and cammingly lifts said first cam member upward to, in turn, move said platen and said lower chamber member into said closed position and, conversely, when said handle is pivoted in the opposite direction, said second cam member pivotally rotates and cammingly lowers said first cam member and, in turn, said platen and said second lower chamber member to said open position.

2. The coffee machine according to claim 1, wherein said second surface of said second member includes a centrally disposed filter member.

3. The coffee machine according to claim 2, wherein said filter member has a plurality of apertures for passage of at least one of steam, hot water and espresso coffee.

4. The coffee machine according to claim 3, wherein said filter member is formed from metal.

5. The coffee machine according to claim 3, wherein said filter member is formed from stainless steel.

6. The coffee machine according to claim 1, wherein said first surface is cup-shaped for receiving a coffee pad.

7. The coffee machine according to claim 6, wherein said second surface is cup-shaped for receiving a coffee pad.

8. The method for preparing espresso coffee from a disposable coffee pad containing finely ground coffee beans, the method comprising the steps of:

providing an espresso coffee machine having means for supplying at least one of steam and hot water, a first upper chamber member having a first surface connected via a first passage to said supply means, a second lower chamber member having a second surface connected via a second passage to a spout, said first member and said second member being movable between an open position for receiving a coffee pad and a closed position for forming, between said first surface and said second surface, a closed sealed chamber to contain the coffee pad, so that in said closed position the at least one of a supply of steam and hot water passes through said chamber containing a coffee pad and discharges as espresso coffee from said spout, and movable means for moving said first member and said second member between said open position and said closed position thereof, said movable means including a platen attached to said second member, two spaced apart vertical posts on which said platen is vertically and reciprocally movable, a horizontally-pivotal elongate handle, a stationery first cam member attached to said platen end a rotatable second cam member attached to said handle and disposed beneath and cammingly engaged with said stationary first cam member, said first and a second cam members being configured and dimensioned such that when said handle is pivoted horizontally from one side to another said second cam member pivotally rotates and cammingly lifts said first cam member upward to, in turn, move said platen and said lower chamber member into said closed position and, conversely, when said handle is pivoted in the opposite direction, said second cam member pivotally rotates and cammingly lowers said first cam member and, in turn, said platen and said second lower chamber member to said open position;

inserting a disposable coffee pad between said first upper chamber member and said second lower chamber member;

moving at least one of said first member and said second member to said closed position to contain the disposable coffee pad in said chamber; and permitting at least one of said supply of steam and hot water into said first member to pass through said chamber containing a coffee pad and to discharge as espresso coffee from said spout.

* * * * *